(12) United States Patent
Yan

(10) Patent No.: US 6,459,204 B1
(45) Date of Patent: Oct. 1, 2002

(54) DUAL-ELEMENT 3-WAY COMPACT FLUORESCENT LAMP

(75) Inventor: Ellis Yan, Aurora, OH (US)

(73) Assignee: Technical Consumer Products, Inc., Aurora, OH (US)

( * ) Notice: Subject to any disclaimer, the term of this patent is extended or adjusted under 35 U.S.C. 154(b) by 0 days.

(21) Appl. No.: 09/748,093

(22) Filed: Dec. 27, 2000

(51) Int. Cl.[7] ................................................. H01J 61/30
(52) U.S. Cl. .............................. 315/58; 315/60; 313/493
(58) Field of Search ........................... 315/56–63, 307, 315/244, 291, 219, 224, DIG. 7, 246, 248; 313/493, 634

(56) References Cited

U.S. PATENT DOCUMENTS

| | | | |
|---|---|---|---|
| 4,748,368 A | 5/1988 | Wilson et al. ................. 313/1 |
| 4,853,591 A | 8/1989 | Klein ........................ 313/493 |
| 4,958,102 A | 9/1990 | Wilson et al. ................. 313/1 |
| 5,128,590 A | 7/1992 | Holzer ........................ 315/58 |
| 5,233,270 A | 8/1993 | Nilssen ....................... 315/58 |
| 5,309,062 A | 5/1994 | Perkins ....................... 315/53 |
| 5,424,610 A | 6/1995 | Pelton ........................ 315/58 |
| 5,552,666 A | * 9/1996 | Shea et al. .................. 313/493 |
| 5,612,597 A | 3/1997 | Wood ......................... 315/293 |
| 5,744,913 A | * 4/1998 | Martich et al. ................ 315/56 |
| 5,831,395 A | 11/1998 | Motrimer et al. ........... 315/307 |

* cited by examiner

Primary Examiner—David Vu
Assistant Examiner—Wilson Lee
(74) Attorney, Agent, or Firm—Joseph H. Taddeo

(57) ABSTRACT

The present invention relates to a compact 3-way fluorescent lamp that is designed to serve as a replacement for a 3-way incandescent bulb. This novel compact 3-way fluorescent lamp uses only two fluorescent tubes, where one tube has twice the wattage rating of the smaller rated tube. The lower wattage unit is a single U-shaped tube and the higher wattage unit is comprised of a pair of U-shaped tubes, having a cross connection at the base of the tubes, giving a continuous gas discharge path through a first U-shaped tube, a cross connecting element, and a second U-shaped tube. Therefore, this lamp gives the appearance of a triple biaxial fluorescent lamp having three U-shaped units, spaced 120 degrees apart, and mounted to the top surface of a ballast housing cover. Two electronic ballasts ignite and operate the two lamp units—a low wattage ballast operates the low wattage unit, the medium wattage ballast operates the dual U-shaped medium wattage unit, and when both units are operational, the highest wattage level is attained. Each of the ballast circuits is optimized to give an enhanced high voltage ignition, thereby eliminating the need for an auxiliary ignition electrode. A pi-section EMI filter suppresses the electromagnetic interference that emanates from the MOSFETs as a result of their switching. Fire hazard protection is given by an internal fusible link.

26 Claims, 8 Drawing Sheets

DUAL-ELEMENT 3-WAY COMPACT FLUORESCENT LAMP

FIELD OF INVENTION

The present invention relates to electric discharge lamps having an ionizable gas discharge path with a luminescent material coating the walls of the discharge path, and more particularly, to a plurality of fluorescent electric discharge lamp elements supported on a base containing an integral self-contained electronic ballasting means, comprising a replaceable 3-way compact fluorescent lamp.

BACKGROUND OF THE INVENTION

Because of the demand for increased energy conservation due to the increased replacement and operating costs, researchers and innovators have been attempting to develop compact electric discharge lamps, such a fluorescent lamps, as screw-in replacements for the standard incandescent bulb. Up to now, these attempts have been hampered by lagging technologies that made large bulky inefficient assemblies that were expensive to manufacture and quite cumbersome at best.

Electromagnetic ballasts, ones which were the predecessors to the electronic ballasts, had the disadvantage of being heavy because of the metal core, failed when overheated because of insufficient cooling and heat-sinking, and were excessively large when compared to a compact bulb itself.

If one were to consider the development of a 3-way triple biaxial fluorescent lamp using electromagnetic ballasts, a rather unwieldy assembly would evolve. It could become necessary to have three electromagnetic ballasts, each correctly sized for each of the three biaxial lamp elements.

Three-way incandescent bulbs are capable of supplying three levels of illumination by controlling the switching sequence that applies power to the two filaments. The common connection between the two filaments connects to the shell of a 3-contact medium or mogul base. The low power filament connects to the ring contact, which lies intermediate the central contact and the shell; and the medium power filament connects to the center contact of the base.

As a replacement for a standard 3-way incandescent bulb having a 3-contact medium base, the switching for the incandescent filaments is sequenced such that the first switch position is the "off" position. The second switch position, "low," connects the first lamp filament to the applied power line; the third switch position, "medium," connects the second lamp filament to the applied power line; and the fourth switch position, "high," connects both the first and second lamp filaments together in parallel, to the applied power line.

U.S. Pat. No. 5,831,395, granted Nov. 3, 1998, to G. W. Mortimer, et al., discloses an adapter having a control circuit and ballasting means that controls the light output of a gas discharge lamp in response to switches that are external to the ballast. Three levels of light output with single or multiple lamps are provided. In one embodiment, it can be mounted in a standard three-way socket for incandescent lamps.

In the event the lamp voltage requirement is too high, Mortimer further teaches that a voltage doubling rectifier circuit for the electronic ballast is needed for optimal operating efficiency. The present invention obviates the need for a voltage doubling rectifier circuit by providing an improved fluorescent lamp starting means.

U.S. Pat. No. 5,612,597, granted Mar. 18, 1997, to P. Wood, discloses an oscillating driver circuit with power factor correction and an electronic lamp ballast employing the same and driver method.

Wood further teaches of a basic prior art electronic ballast that consists of L-C series resonant circuits with the lamps connected across one of the reactances. He also teaches that because fluorescent lamps do not require high striking voltages, a Q of two or three is sufficient to produce a "flat" Q curve.

In the present in invention, a novel high voltage starting circuit that optimizes the serially connected L-C circuit for optimum transient response, as opposed to the prior art L-C series resonant response is used.

U.S. Pat. No. 5,424,610, granted Jun. 13, 1995, to B. A. Pelton, discloses an outboard ballast that allows a compact fluorescent light bulb and its associated ballast to be positioned within a standard table lamp having a standard-size harp.

Pelton teaches of a table lamp configuration using a compact fluorescent lamp (without having an internal ballast), screwed into a lamp socket, which supports a lamp harp, to which an external ballast is mounted. The present invention relates to a compact 3-way fluorescent lamp, having a self-contained ballasting means, to be used as a replacement for a 3-way incandescent bulb.

U.S. Pat. No. 5,309,062, granted May 3, 1994, to R. A. Perkins, discloses a compact low-pressure gas discharge lamp assembly having a base and a plurality of low-pressure gas discharge light generating elements that is capable of being individually energized. An external ballast circuit assembly is provided to supply electrical energy to a variable number of low-pressure gas discharge elements. The output of the ballast connects to a three position switch, where in the first position connects to a single element; in the second position, to two elements connected in parallel; and in the third position, to all three elements. The operating frequency of the ballast varies as a function of the number of light-generating elements connected by the switch to the ballast circuit.

Perkins teaches of a compact fluorescent lamp arrangement, having an externally located electronic ballast, electrically sized to the maximum combined wattage of the three lamp elements combined. In the "medium" connection, two lamp elements are operated in parallel. The present invention uses three biaxially arranged tubes, symmetrically arranged and mounted on a single base, each tube spaced 120 degrees apart, where two of the tubes are joined and bonded to form a single double biaxial tube, which comprises two tube elements essentially connected serially.

U.S. Pat. No. 4,958,102, granted Sep. 18, 1990, to W. E. Wilson, et al., discloses a three-way lamp having two orthogonally mounted, U-shaped gas discharge light tubes, one larger than the other, mounted in the same housing; having three terminals arranged in the same configuration as a three-way incandescent lamp.

Wilson, et al., teaches of a three-way gas discharge lamp, having magnetic ballasts, as opposed to having electronic ballasts integrated into the housing structure. A lamp of this type could have been manufactured only by extremely complex manufacturing processes.

U.S. Pat. No. 4,853,591, granted Aug. 1, 1989, to L. Klein, et al., discloses a gas discharge vessel comprising at least two U-shaped units having two longitudinal leg portions extending parallel to each other and a cross element or base portion of the U, connecting the leg portions to the base of the U. To facilitate lamp starting, an auxiliary electrode is pinch sealed adjacent the cross connection and coupled by an impedance to the "hot" current carrying electrode.

In the present invention, the need for an auxiliary electrode as required by Klein, is obviated by the introduction of a novel high voltage starting circuit that optimizes the serially connected L-C circuit for optimum transient response as opposed to the prior art optimization of the L-C series resonant response.

U.S. Pat. No. 4,748,368, granted May 31, 1988, to W. E. Wilson, et al., discloses a three-way lamp having two orthogonally mounted, U-shaped gas discharge light tubes, one larger than the other, mounted in the same light-transmitting bulb; having three terminals arranged in the same configuration as a three-way incandescent lamp.

Wilson, et al., further teaches of a gas discharge lamp for use as a replacement for an incandescent bulb, where two U-shaped gas discharge tubes, one larger than the other, are mounted orthogonally on the same housing. It is further taught the use of magnetic ballasts, which when operated at 60 Hertz, become unduly large and operate at substantially higher than ambient temperatures. The present invention uses three biaxially arranged tubes, symmetrically arranged and mounted on a single base, each tube spaced 120 degrees apart, where two of the tubes are joined and bonded to form a single double biaxial tube.

U.S. Pat. No. 3,899,712, granted Aug. 12, 1975, to H. L. Whitting, discloses an improved electric discharge lamp comprising a tapered cylinder envelope having a helical shaped channel of nonuniform pitch for providing a circumferential discharge path around the envelope with a pair of electrodes disposed adjacent each end of the discharge path. The standard screw-in base supports a ballast device located within the central region of the lamp.

Whitting teaches of single-way helical gas discharge lamp using magnetic ballasts, whereas the present invention relates to a 3-way design using electronic ballasts.

Other prior art includes U.S. Pat. No. 5,233,370, granted Aug. 3, 1993, to O. E. Nilssen, and U.S. Pat. No. 5,128,590, granted Jul. 7, 1992, to W. Holzer, discloses compact fluorescent lamps that are screw-in types and are self ballasting. However, neither teaches of being designed for use as 3-way replacement lamps.

What is needed is a compact 3-way fluorescent lamp that is directly interchangeable with a 3-way incandescent bulb to serve as an alternative replacement that is easy to manufacture and is lower in cost. This lamp should be of one-piece construction, having dual elements, and include a dual integrated electronic ballasting arrangement. It should also provide the equivalent illumination as its predecessor. In this regard, the present invention fulfills this need.

SUMMARY OF INVENTION

The present invention relates to a compact 3-way fluorescent lamp that is designed to serve as a replacement for a 3-way incandescent bulb. Even though the initial cost of a fluorescent lamp is greater than an incandescent bulb, a 3-way fluorescent lamp is advantageous for use because an 11/22/33 watt fluorescent lamp produces the same illumination equivalent to a 50/100/150 incandescent bulb and is more efficient to operate. In addition, there is less maintenance since it does not have to be replaced as frequently as the incandescent bulb because of its enhanced longevity.

The newly designed 3-way fluorescent lamp uses the same base configuration and the same electrical connections as a standard 50/100/150 watt incandescent bulb. The base is a standard 3-contact medium base, where the outer shell connects to the neutral wire to minimize a shock hazard should the user inadvertently come in contact with the shell when installing the lamp into its socket. The ring contact connects to the low wattage unit and the center contact, to the medium wattage unit.

In the preferred embodiment, an ideal lamp configuration for use as a 3-way compact fluorescent lamp is one where there appears to have three individual U-shaped lamp elements, where each lamp element is equally spaced 120 degrees apart circumferentially. Ideally, each lamp element comprises a U-shaped tube that is secured to a circular lamp housing.

Each U-shaped tube has two longitudinal leg portions that extend downwards and are parallel to each other.

The low wattage lamp element has a lamp filament-carrying electrode at each end of the U-shaped tube, where the ends are glass welded and sealed.

The medium wattage lamp, however, is comprised of two U-shaped tube elements that are bridged together using a cross element at the base of the U-shaped tubes. A lamp filament-carrying electrode is installed at the extreme ends of the U-shaped tubes, where each end is ultimately glass welded and sealed. The U-shaped ends on either side of the cross element are also glass welded and sealed. A continuous gas discharge path now exists between the two filaments traversing through a first U-shaped tube, a cross element, and a second U-shaped tube.

This configuration is quite advantageous and desirable because the light output is enhanced over having only one U-shaped structure. The two bridged, U-shaped structures perform essentially as two 11-watt lamps that are serially connected. In this configuration, when the optimum mercury vapor pressure is achieved, a total wattage of 22-watts, results.

In addition, the configuration of having the three U-shaped elements equally spaced 120 degrees apart, creates the uniform symmetry that is observed in a typical triple biaxial compact fluorescent lamp.

The primary advantage of using a conventional single U-shaped tube in combination with a pair of bridged U-shaped tubes is that only two lower wattage electronic ballast circuits are needed—a 11-watt ballast for the single U-shaped unit and a 22-watt ballast for the bridged dual U-shaped unit.

In another aspect of the present invention, the ballast circuit is improved so that a higher lamp ignition voltage is attained. This is accomplished by optimizing the L-C circuit parameters for optimum transient performance, instead of optimizing for the optimum resonant frequency response.

With the higher starting voltage, need for an auxiliary igniting electrode is obviated, resulting in a reduced manufacturing cost.

To reduce the amount of electromagnetic radiation, emanated by the high frequency switching transients of the MOSFETs, a 3-element pi-section EMI low-pass filter is used to reduce the amount of conducted and radiated interference.

To further eliminate the possibility of creating a fire hazard, a fusible link (fusister) is provided to disconnect the ballast circuitry in the event of a catastrophic failure, such as a short circuit.

Accordingly, it is therefore an object of the present invention to provide a novel compact 3-way fluorescent lamp that can be used as a replacement for an incandescent 3-way lamp.

It is another object of the present invention to provide a novel compact 3-way fluorescent lamp that uses only two fluorescent tubes, where one tube has twice the wattage rating of the smaller rated tube.

It is still another object of the present invention to provide a novel compact 3-way fluorescent lamp, comprised of 3 U-shaped tubes, where the lower wattage unit is a single U-shaped tube and the higher wattage unit is comprised of a pair of U-shaped tubes, having a cross connection at the base of the tubes, giving a continuous gas discharge path through a first U-shaped tube, a cross connecting element, and a second U-shaped tube.

It is still yet another object of the present invention to provide a novel compact 3-way fluorescent lamp that has the three U-shaped tubes spaced equally 120 degrees apart upon the top of the ballast housing.

It is a further object of the present invention to provide a novel compact 3-way fluorescent lamp that uses a dual ballasting arrangement for starting and operating the two fluorescent lamp units—comprising a low wattage ballast circuit and a medium wattage circuit.

It is still a further object of the present invention to provide a novel compact 3-way fluorescent lamp that uses an integrated pair of electronic ballasts having an improved lamp igniting circuit, one that optimizes the transient voltage performance to eliminate the need for an auxiliary igniting electrode in the dual U-shaped lamp.

It is still yet a further object of the present invention to provide a novel compact 3-way fluorescent lamp that utilizes an EMI filter to reduce the electromagnetic interference caused by the switching of the MOSFETs.

A final object of the present invention is to provide a novel compact 3-way fluorescent lamp that utilizes a fusible link (fusister) to disconnect the ballast circuitry in the event of a catastrophic failure, such as a short circuit.

These and other objects of the present invention will become apparent upon further review and understanding of the detailed specification and drawings that follow.

DETAILED DESCRIPTION OF THE PRESENT INVENTION

The present invention relates primarily to a compact dual element 3-way fluorescent lamp that is designed for use as a direct replacement for a 3-way incandescent bulb.

Figure 1:
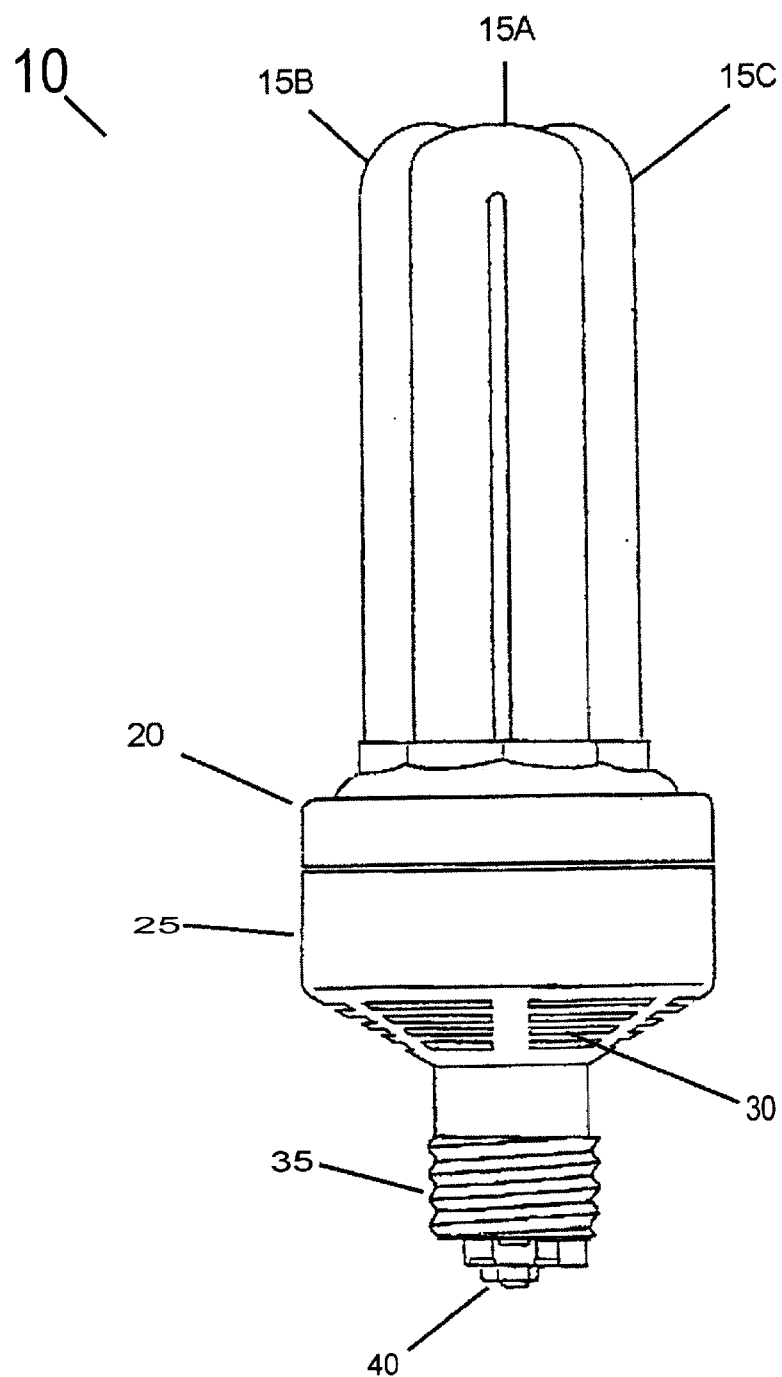
FIG. 1 is a side elevational view of the dual element 3-way fluorescent lamp of the present invention.

FIG. 1 is a side elevational view illustrating the dual element 3-way fluorescent lamp 10 comprised of three U-shaped lamp members 15A, 15B and 15C, permanently secured into the upper ballast housing 20. At the inward, upper edge of the lower ballast housing 25 is a circumferential ring that engages a retaining groove in the lower portion of the upper ballast housing 20 (not shown), which locks the two assemblies into a one-piece ensemble. Ventilation louvers 30 provide an adequate flow of air to cool the major heat generating devices contained within the ballast assembly. At the base of the lower ballast housing 25 is a standard medium base screw-in plug 35 that is adapted for insertion into a standard medium base screw-in lamp socket. At the bottom of the medium base screw-in plug 35 are a set of contacts having a 3-contact plug 40 suitable for engaging with the 3-contact receptacle found in a standard 3-way medium base screw-in lamp socket.

Figure 2:
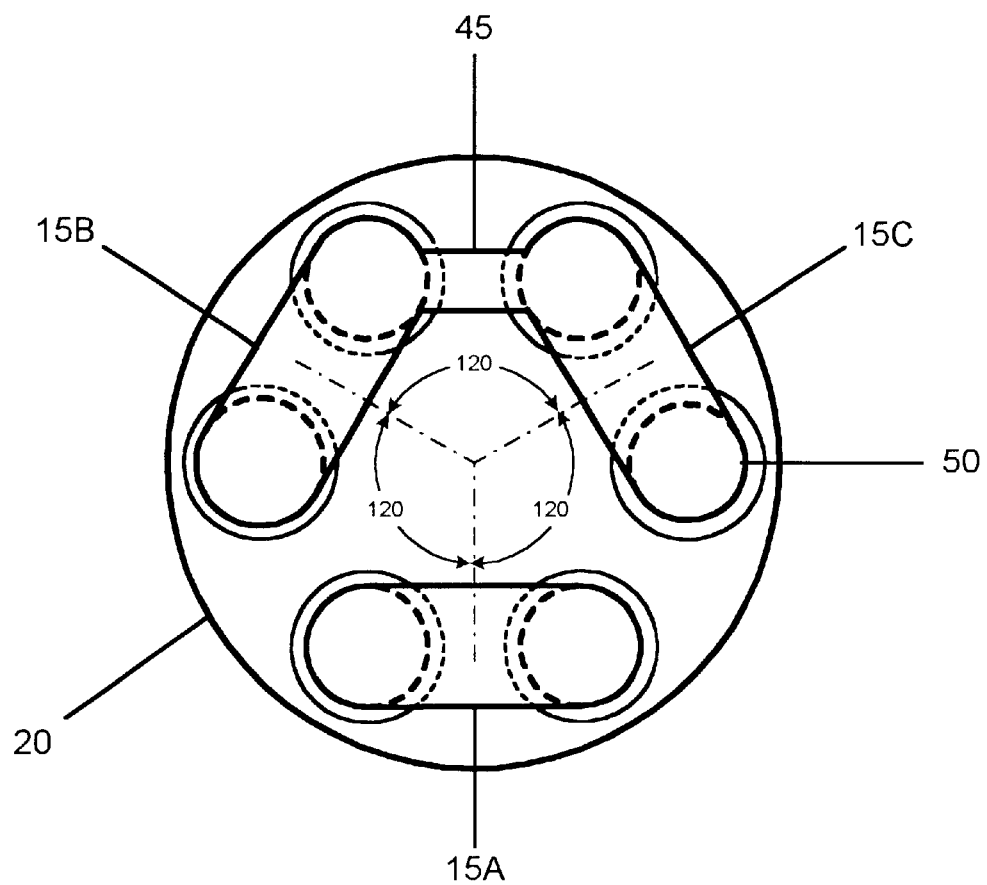
FIG. 2 is a top view of the dual element 3-way fluorescent lamp of the present invention showing the newly designed bridged dual bi-axial lamp element.

With reference to FIG. 2, there is shown a top view of the physical arrangement of the three U-shaped lamp members 15A, 15B and 15C. The lamp members are symmetrically arranged and mounted on a single base 20, where each lamp member is equally spaced 120 degrees apart circumferentially.

The illumination sources are comprised of two lamp elements. They are: (1) a low wattage illumination source comprised of a single lamp member 15A and (2) a medium wattage source of illumination 50 comprised of two lamp members 15B and 15C, where the two tubes are joined and bonded using a cross connecting element 45 to form one joined double biaxial tube. When structured in this manner, the illumination source 50 performs essentially as two serially connected low wattage lamps operating in parallel from the same electrical source.

Figure 3:
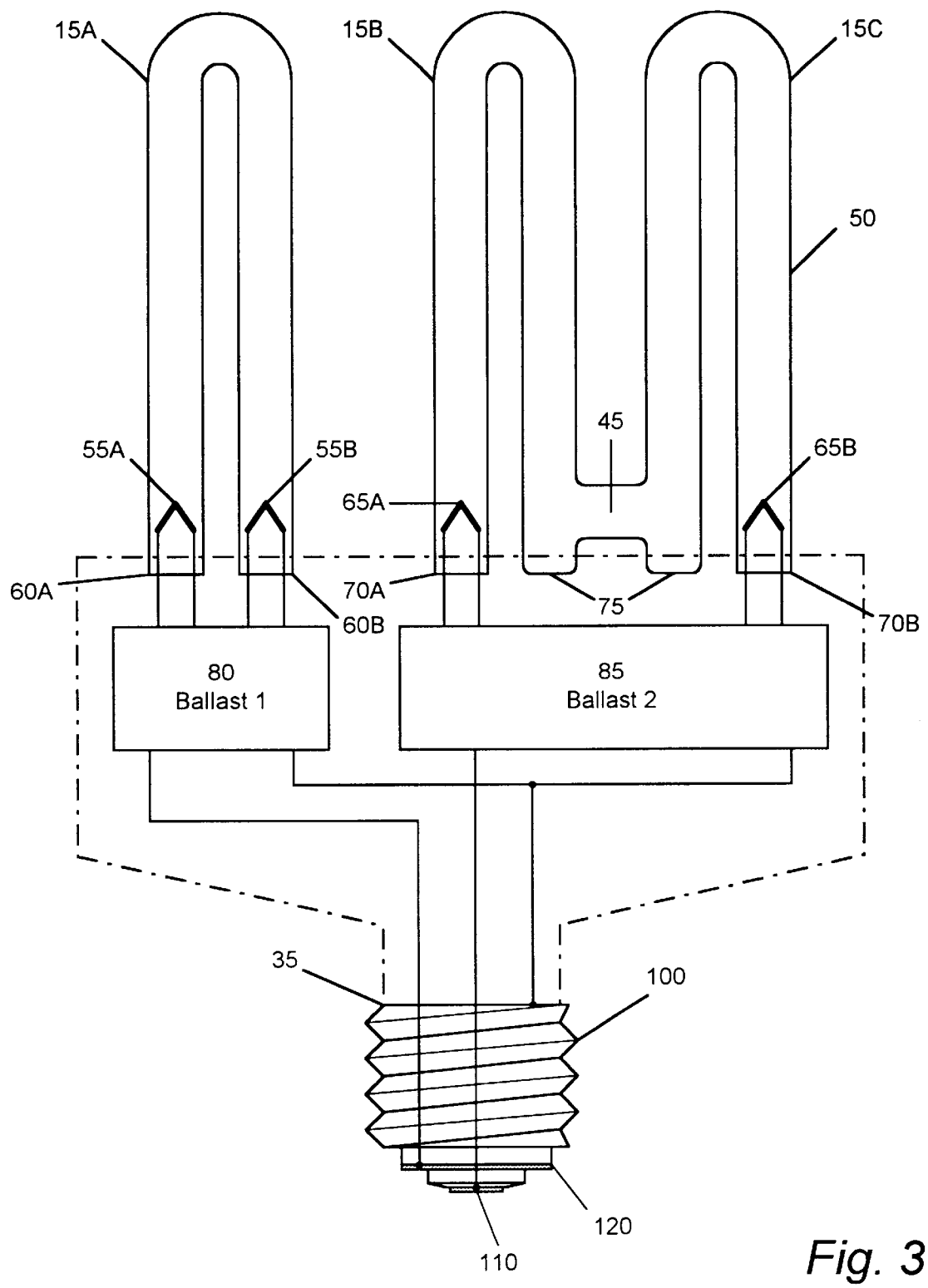
FIG. 3 is a pictorial representation of the dual element 3-way fluorescent lamp showing the interconnection of the lamp elements and the respective electronic ballast means.

Turning now to FIG. 3, illustrated is a pictorial representation of the dual element 3-way fluorescent lamp showing the interconnection of the lamp elements and the respective electronic ballast means.

Each of the three lamp members is comprised of a U-shaped tube having two longitudinal leg portions that extend parallel to each other.

Lamp member 15A is a single unit where a first filament carrying electrode or cathode 55A is inserted into the open end of one leg and is glass welded and sealed at 60A, and a second filament carrying electrode or cathode 55B is inserted into the open end of the remaining leg and is glass welded and sealed at 60B.

The second unit 50 is comprised of two serially connected members 15B and 15C where a cross connecting element 45 connects the two U-shaped members to form a single continuous uninterrupted gas discharge path. On either end below the cross connecting element are two open U-tube ends 75 that have no electrodes inserted. These open ends are subsequently glass welded and sealed.

A first filament carrying electrode or cathode 65A is inserted into the remaining open leg of U-shaped member 15B and is glass welded and sealed at 70A, and a second filament carrying electrode or cathode 65B is inserted into the open end of the remaining leg and is glass welded and sealed at 70B.

In the preferred embodiment, lamp member 15A is rated at 11-watts and lamp member 50, rated at 22-watts—thereby giving a total of 33-watts when both lamps are simultaneously lit.

The cathodes 55A and 55B of lamp member 15A connect to the low wattage ballast 80 and the cathodes 65A and 65B of lamp member 50 connect to the medium wattage ballast 85.

Thus, the newly designed compact three-way fluorescent lamp is capable of supplying three levels of illumination by controlling the switching sequence that applies power to the two ballast circuits. The common connection between the two ballast circuits connects to the shell 100 of a 3-contact medium base 35. The low power ballast 80 connects to the ring contact 120, which lies intermediate the central contact 110 and the shell 100; and the medium power ballast 85 connects to the center contact 110 of the base 35.

Figure 4:
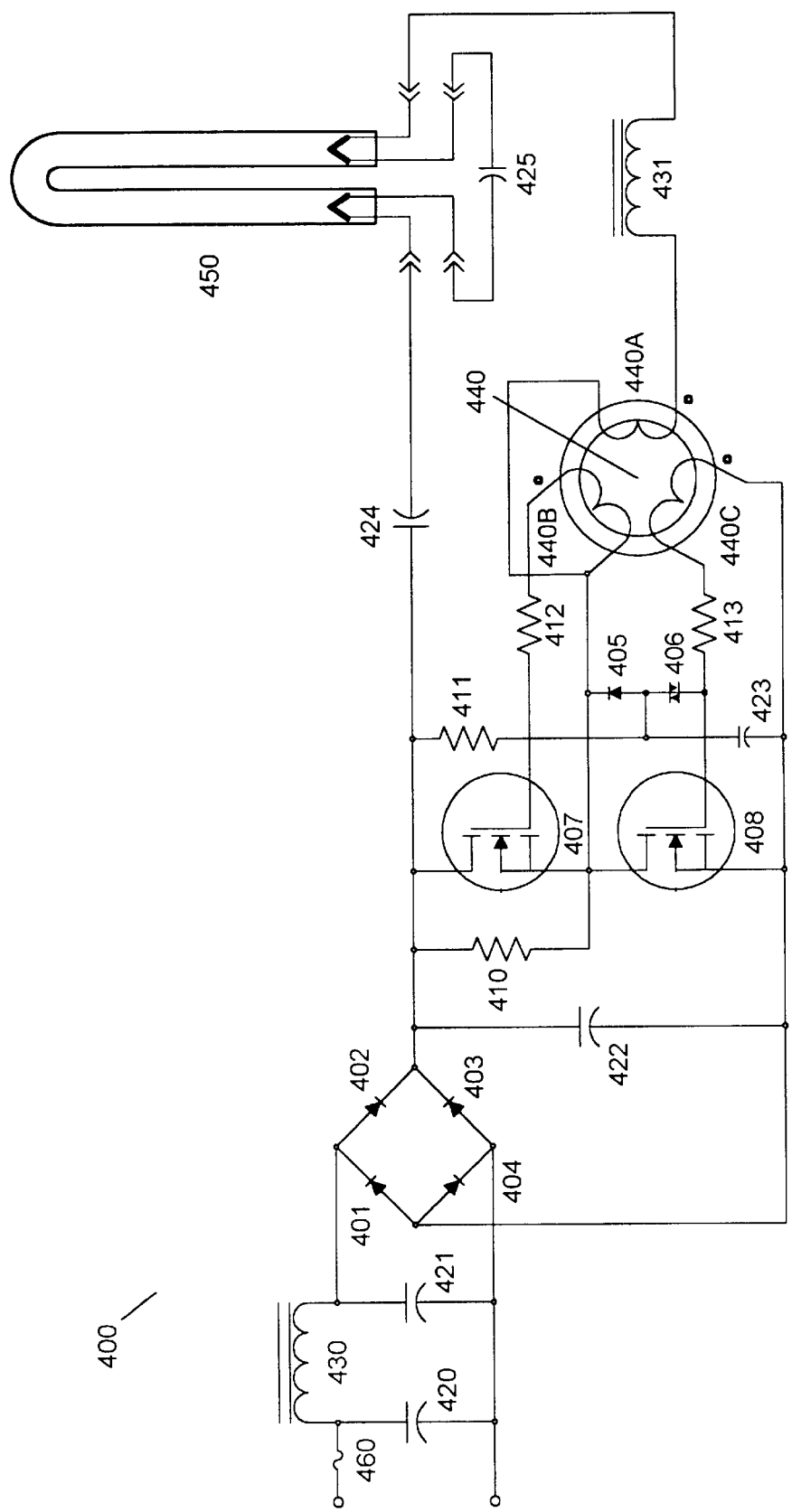
FIG. 4 is a schematic drawing of the low wattage electronic ballast showing its connection to the low wattage U-shaped fluorescent lamp element.

Referring now to FIG. 4, there is shown the low wattage ballast circuit 400 for the low wattage lamp 450. Two MOSFETs 407 and 408, arranged in a half-bridge totem pole configuration, are driven to conduct alternately by the secondary windings 440B and 440C of toroidal transformer 440. Gate resistors 412 and 413 provide the necessary current limiting commensurate with the corresponding impedance matching for the gate circuitry. The capacitor 423 is charged via the current flowing through resistor 411. The voltage drop across capacitor 423 rises until it reaches the threshold voltage of DIAC 406. Once reaching the threshold voltage, the DIAC triggers the MOSFET 408 into conduction. Resistor 410 provides the necessary load for which the MOSFET 408 is to operate.

Sustained oscillation of the MOSFET circuitry results once MOSFET 408 is triggered into conduction by the DIAC 406, which in turn causes the load current to flow through the primary winding 440A. The addition of diode 405 improves the performance of the oscillator by discharging capacitor 423, when MOSFET 408 is triggered into conduction.

A high frequency square wave, which is nominally 40 kHz, drives the lamp load 450 and its associated reactive elements. In the starting mode, the reactive elements are comprised principally of inductor 431, which is preferably 4 mH @ 3 ohms, and capacitor 425, which is preferably 9100 pf @ 1 kV. Once the lamp 450 is ignited, the reactive elements are comprised principally of inductor 431, which is preferably 4 mH @ 3 ohms, and capacitor 424, which is preferably 0.1 mfd @ 400 volts.

A high ignition voltage for the fluorescent lamp 450 is attained by optimizing the transient response using a high Q inductor 431, having a Q of 225 or greater. When the L-C starting circuit, comprised of inductor 431 and capacitor 425, functions at its tuned natural undamped resonant frequency of approximately of 27 kHz, a maximum peak starting voltage between 800 and 950 volts can be attained for the reliable starting of fluorescent lamp 450.

After the lamp is ignited, capacitor 425 is essentially shorted by the lamp conducting impedance, which results in the inductor 431 and capacitor 424 dominating the tuned natural undamped resonant frequency of approximately 8 kHz for the operating L-C circuit.

To reduce the amount of EMI conducted into the power lines to an acceptable level, an EMI filter comprised of inductor 430 and capacitors 420 and 421 are provided.

The DC power supply, which supplies the power to the ballast circuitry, is comprised of full wave bridge rectifiers 401, 402, 403 and 404, which is subsequently filtered by electrolytic capacitor 422.

A fusible link 460 provides the necessary safety protection in the event a catastrophic failure of some component within the ballast circuitry.

Figure 5:
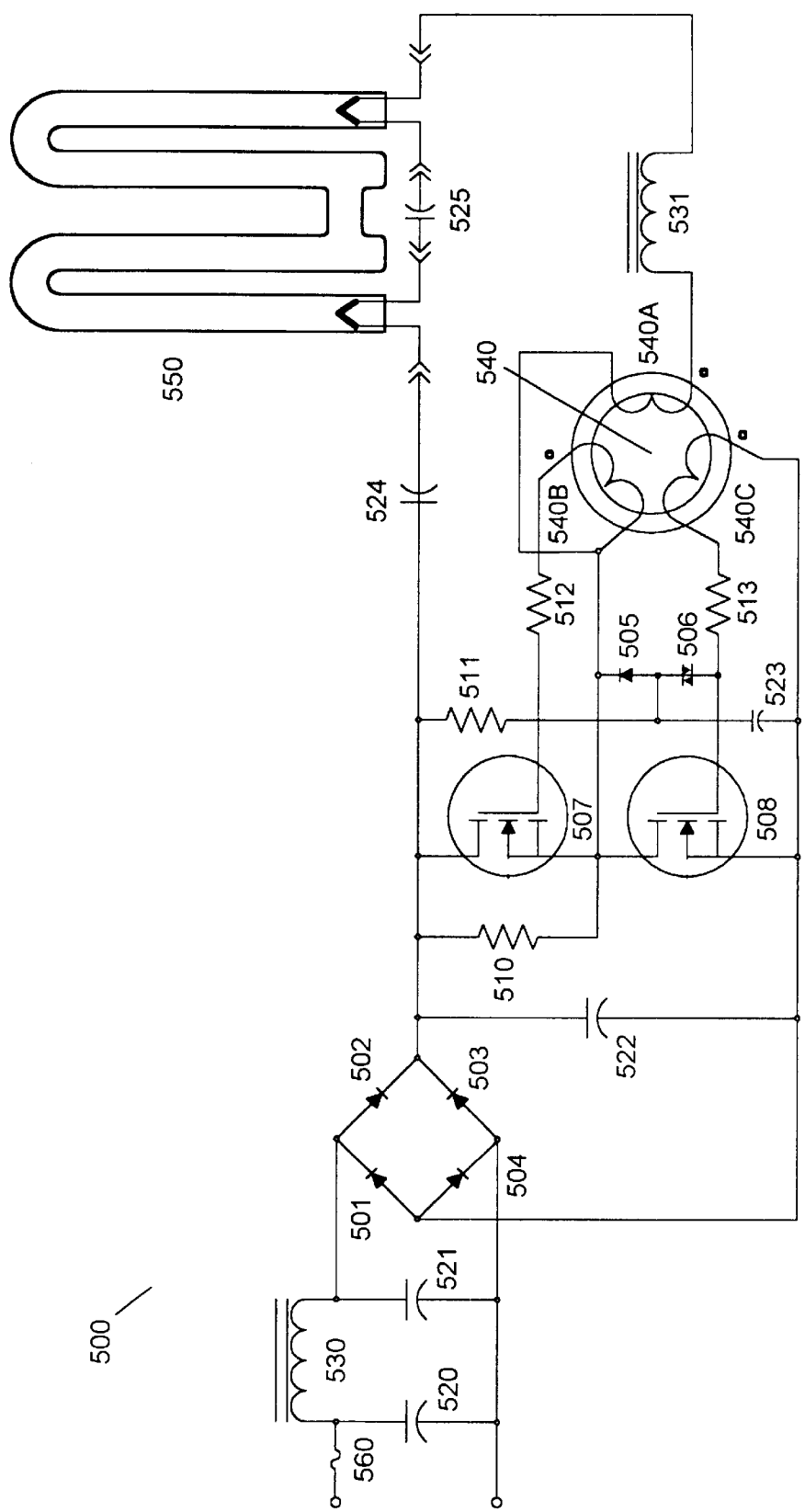
FIG. 5 is a schematic drawing of the medium wattage electronic ballast showing its connection to the medium wattage fluorescent lamp, having dual U-shaped elements that are cross joined at the lower sealed ends.

As shown in FIG. 5, the medium wattage ballast circuit 500 for the medium wattage lamp 550 uses the same components, (MOSFETs 507, 508, DIAC 506, toroidal transformer 540), as is used in the low wattage ballast 400, except for the following limits. The resistors 512 and 513 are preferably reduced to 1.5 ohms each to accommodate the increased power requirement.

Because there is no auxiliary starting electrode in the fluorescent lamp 550, the ballast circuit requires a high fluorescent tube igniting voltage. This higher igniting voltage is accomplished by an improved novel high voltage starting circuit that optimizes the serially connected L-C circuit for optimum transient response.

To attain high voltage operation, when starting the fluorescent tube, the inductor 531, which is preferably 1.3 mH@2.6 ohms, and capacitor 525, which is preferably 6800 pf @ 1 kV. Once the lamp 550 is ignited, the reactive elements are comprised principally of inductor 531, and capacitor 524, which is preferably 0.1 mfd @ 400 volts.

A high ignition voltage for the fluorescent lamp 550 is achieved by optimizing the transient response using a high Q inductor 531 that has a Q of 160 or greater. When the L-C starting circuit, comprised of inductor 531 and capacitor 525, functions at its tuned natural undamped resonant frequency of approximately of 53 kHz, a maximum peak starting voltage between 800 and 950 volts can be attained for the reliable starting of fluorescent lamp 550.

Once the lamp 550 is ignited, capacitor 525 is essentially shorted by the lamp conducting impedance, which results in the inductor 531 and capacitor 524 dominating the tuned natural undamped resonant frequency of approximately 14 kHz for the operating L-C circuit.

Figure 6:
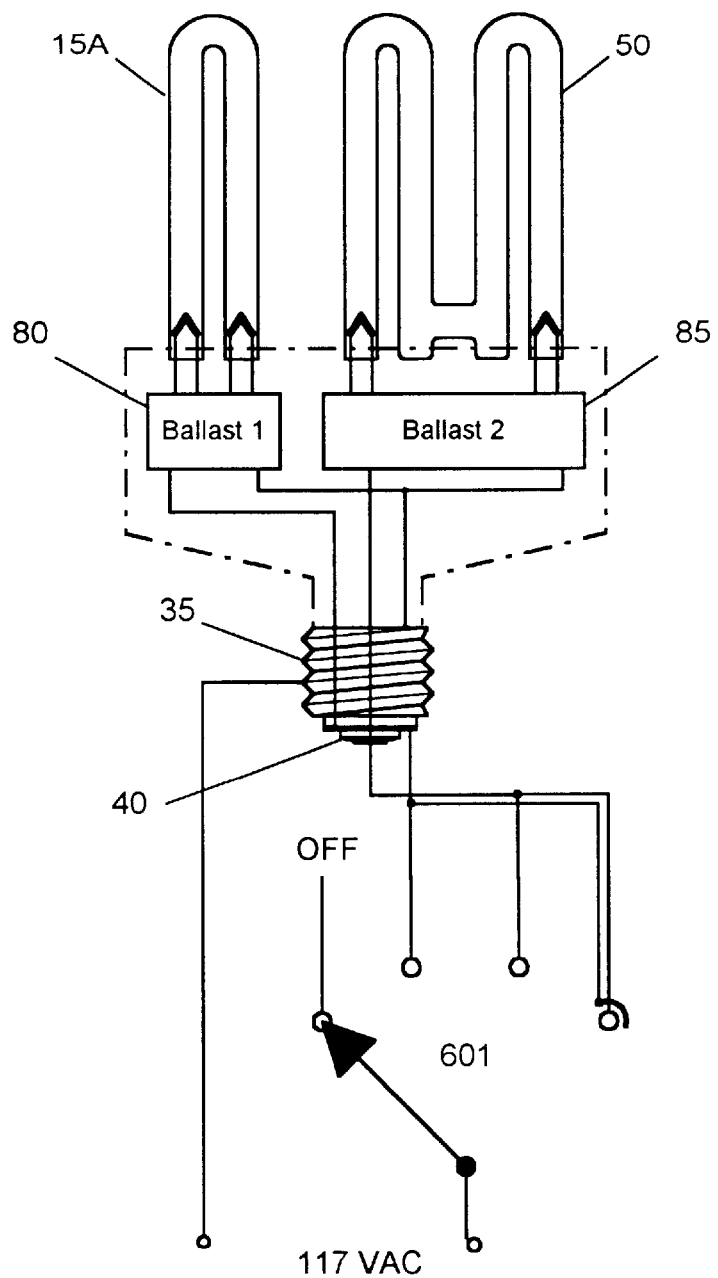
FIG. 6 is a schematic representation showing a typical connection of a three position "ON" rotary switch to the preferred embodiment of the present invention.

FIG. 6 illustrates the 3-way switching arrangement when used as a replacement for a standard 3-way incandescent bulb having a 3-contact medium base 35. The switching for the dual element fluorescent lamp is sequenced such that the first switch position of switch 601 is the "off" position. The second switch position, "low," connects the input of low power ballast 80 to the applied power line; the third switch position, "medium," connects the input of ballast 85 to the applied power line; and the fourth switch position, "high," connects both inputs to ballasts 80 and 85 in parallel, to the applied power line.

Figure 7:
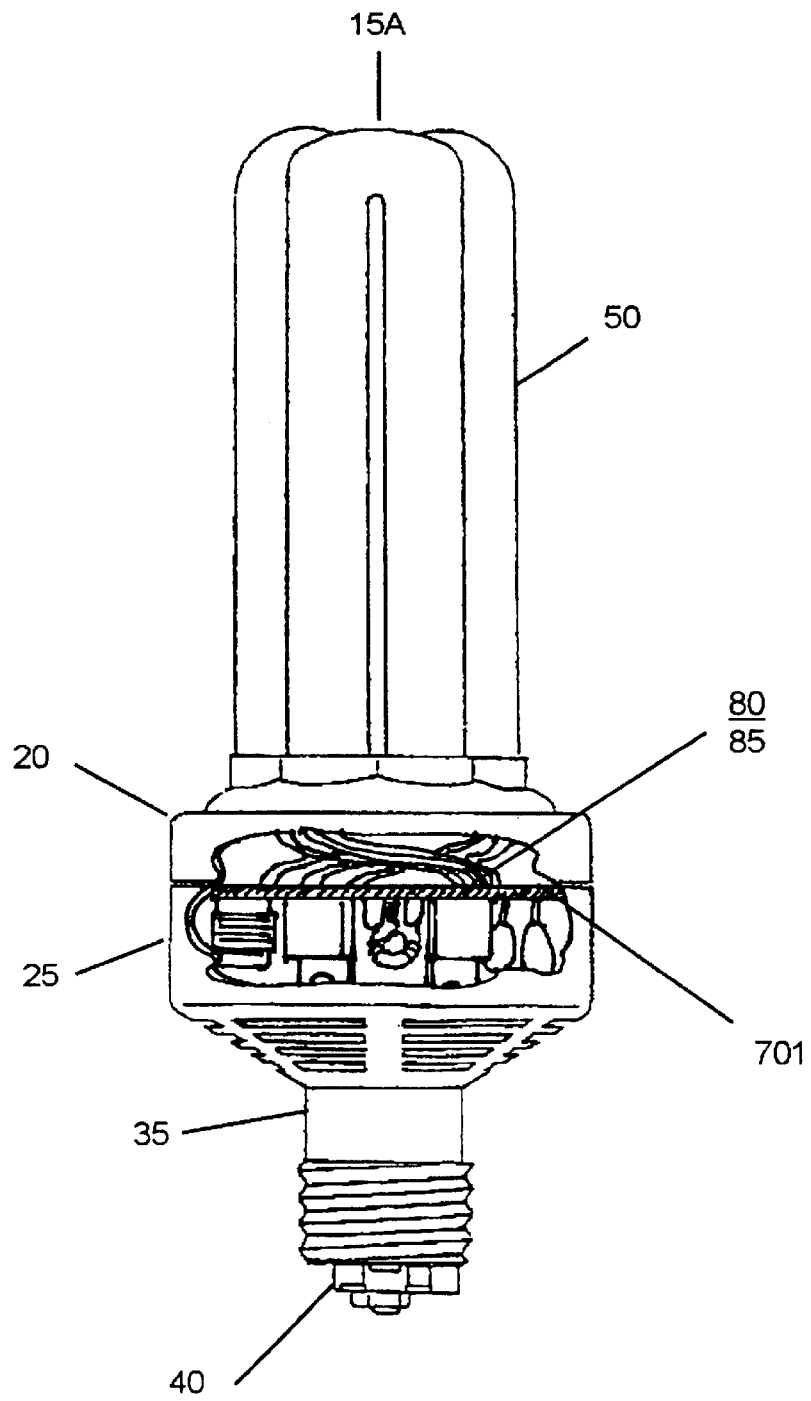
FIG. 7 is a side view of the dual element 3-way fluorescent lamp of the present invention showing the position of the dual electronic ballasts in section.

With reference to FIG. 7, there is shown is a side view of the dual element 3-way fluorescent lamp 10 of the present invention showing the position of the dual electronic ballast printed circuit board 701 in section.

Figure 8:
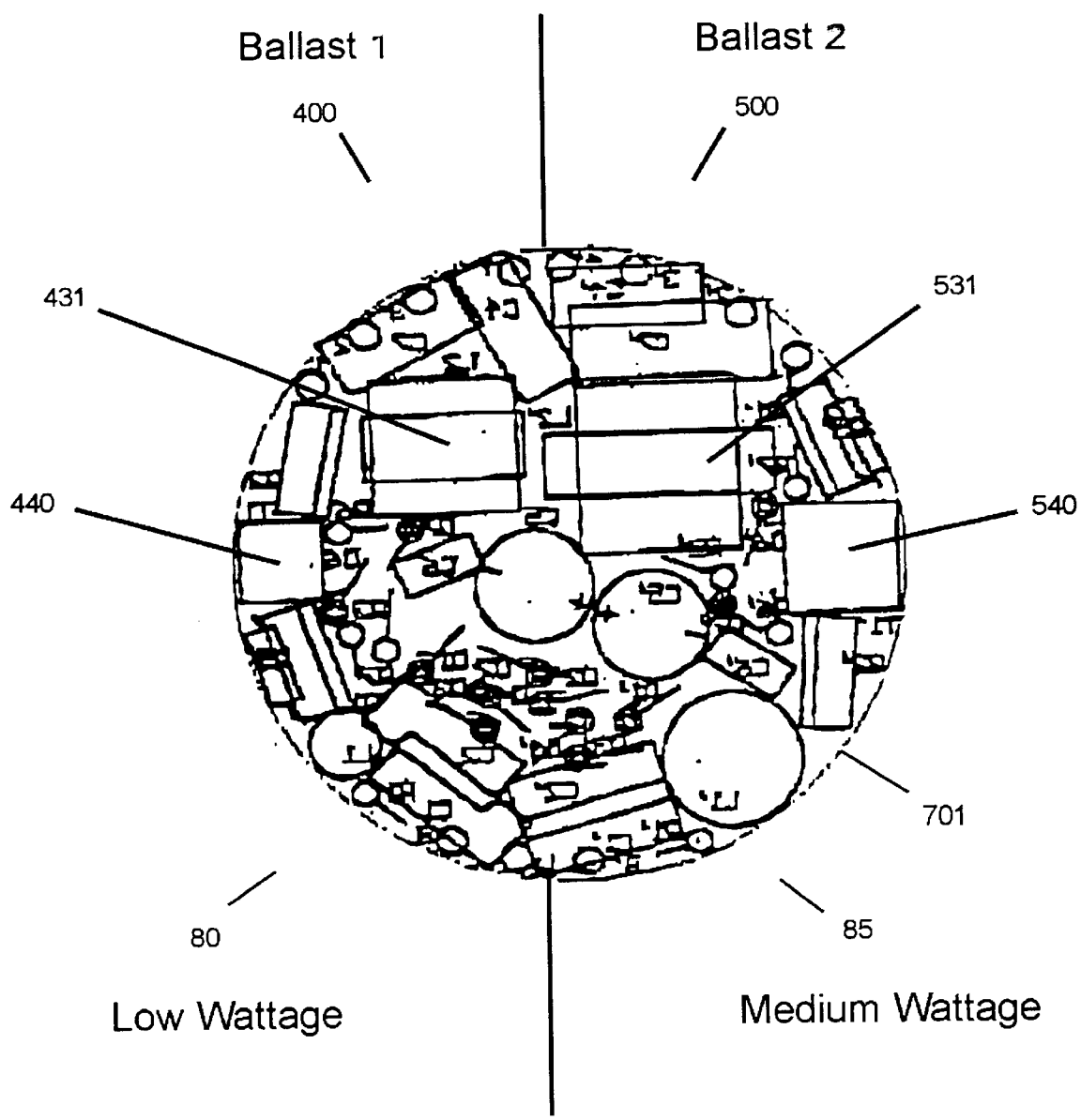
FIG. 8 is a bottom view of a circular printed circuit board showing the component parts arrangement of the dual ballast.

FIG. 8 depicts the bottom view of a circular printed circuit board 701 showing the component parts arrangement of the dual ballast.

In an alternative embodiment, the dual element compact fluorescent lamp of the present invention can be configured to serve as a replacement for a 3-way incandescent bulb having a mogul base.

It should be understood that even though the present invention is described in detail for its particular embodiment, there may be other variations and modifications that will become apparent to those who are skilled in the art, and that these modifications or variations that can be made should not detract from the true spirit of this invention.

What is claimed is:

1. A compact 3-way fluorescent lamp for use as replacement for a standard incandescent 3-way lamp, comprising:

first and second fluorescent light sources mounted on a ballast housing and connected to an electronic ballast secured in the housing and forward of a screw-in base having a 3-contact plug for insertion into and engagement with a 3-contact receptacle of a standard 3-way screw-in lamp socket;

the electronic ballast including a dual electronic ballast arrangement on a ballast circuit board having an integrated pair of electronic ballast units including a first low wattage ballast circuit for operation of the first fluorescent light source and a second medium wattage circuit for operation of the second fluorescent light source; and, wherein the compact 3-way fluorescent lamp and the electronic ballast are integrated in a one-piece unit.

2. A compact 3-way fluorescent lamp for use as replacement for a standard incandescent 3-way lamp, comprising:

first and second fluorescent light sources mounted on a ballast housing and connected to an electronic ballast secured in the housing and forward of a screw-in base having a 3-contact plug for insertion into and engagement with a 3-contact receptacle of a standard 3-way screw-in lamp socket;

the screw-in base having an associated switch for controlling a switching sequence in applying power to the first and second fluorescent light sources for providing three levels of illumination;

the first fluorescent light source including a first U-shaped biaxial tube;

the second fluorescent light source including a second and a third U-shaped biaxial tube connected serially through a bridge connection to form a double biaxial tube and a consequent continuous gas discharge path through the bridge connection and the second and the third U-shaped biaxial tubes; and the compact 3-way fluorescent lamp and the electronic ballast are integrated in a one-piece unit.

3. A compact 3-way fluorescent lamp for use as replacement for a standard incandescent 3-way lamp, comprising:

first and second fluorescent light sources mounted on a ballast housing and connected to an electronic ballast secured in the housing and forward of a screw-in base having a 3-contact plug for insertion into and engagement with a 3-contact receptacle of a standard 3-way screw-in lamp socket;

the screw-in base having an associated switch for controlling a switching sequence in applying power to the first and second fluorescent light sources for providing three levels of illumination;

the first fluorescent light source including a first U-shaped biaxial tube;

the second fluorescent light source including a second and a third U-shaped biaxial tube;

the first, the second, and the third U-shaped biaxial tubes are spaced approximately one hundred twenty (120) degrees apart in a symmetrical arrangement on the ballast housing; and wherein the compact 3-way fluorescent lamp and the electronic ballast are integrated in a one-piece unit.

4. The compact 3-way fluorescent lamp in accordance with claim 1, wherein the screw-in base includes an associated switch to control a switching sequence to apply power to the first and second fluorescent light sources to provide three levels of illumination.

5. The compact 3-way fluorescent lamp in accordance with claim 4, wherein the first fluorescent light source includes a single U-shaped biaxial tube.

6. The compact 3-way fluorescent lamp in accordance with claim 5, wherein the second fluorescent light source includes a pair of U-shaped biaxial tubes joined and bonded serially to form a double biaxial tube.

7. The compact 3-way fluorescent lamp in accordance with claim 6, wherein the double biaxial tube includes a bridge connection of the pair of U-shaped biaxial tubes with tube ends on either side of the bridge connection and a consequent continuous gas discharge path through each U-shaped biaxial tube and the bridge connection of the second light source.

8. The compact 3-way fluorescent lamp in accordance with claim 7, wherein the single U-shaped biaxial tube and the pair of U-shaped biaxial tubes are spaced approximately one hundred twenty (120) degrees apart in a symmetrical arrangement on the ballast housing.

9. The compact 3-way fluorescent lamp in accordance with claim 8, further including a starter in each electronic ballast unit that obviates the need for a voltage doubling rectifier circuit.

10. The compact 3-way fluorescent lamp in accordance with claim 9, wherein each electronic ballast unit further includes a means for optimizing the transient voltage performance of a serially connected L-C circuit for an optimum transient response as opposed to optimizing a series resonant response.

11. The compact 3-way fluorescent lamp in accordance with claim 10, wherein each ballast unit further includes a high voltage igniting circuit with a high Q inductor forward of first and second serially connected capacitors, the first capacitor having a larger capacitance value than the second capacitor to produce an optimum transient response when igniting the compact 3-way fluorescent lamp, thereby eliminating the need for an auxiliary igniting electrode.

12. The compact 3-way fluorescent lamp in accordance with claim 11, wherein the first capacitor sustains operation of the compact 3-way fluorescent lamp after ignition.

13. The compact 3-way fluorescent lamp in accordance with claim 12, wherein each electronic ballast unit includes an oscillator having a DIAC, first and second MOSFETs in a half-bridge totem pole configuration, a toroidal transformer with three windings, and a gate circuitry including two resistors for limiting the current commensurate with a corresponding impedance matching of the gate circuitry.

14. The compact 3-way fluorescent lamp in accordance with claim 13, further including a sustained oscillation once the first MOSFET is triggered into conduction for a load current flow modified through the transformer to provide a high frequency square wave to drive the lamp load successively controlled by said capacitors.

15. The compact 3-way fluorescent lamp in accordance with claim 14, wherein the first fluorescent light source has approximately one-half the wattage rating of the second fluorescent light source.

16. The compact 3-way fluorescent lamp in accordance with claim 15, wherein the 3-way contact plug includes a threaded shell with a common connection to the first low wattage ballast circuit and the second medium wattage ballast circuit, a central contact connected to the second medium wattage ballast circuit, and a ring contact situated intermediate the central contact and the shell to provide power to the first low wattage ballast circuit.

17. The compact 3-way fluorescent lamp in accordance with claim 16, further including a switching sequence having a first off position, a second low position to power the first low wattage ballast circuit and the first light source, a third medium position to power the second medium wattage ballast circuit and the second light source and a fourth high position to power both first low wattage ballast circuit and second medium wattage ballast circuit and the first light source and the second light source in parallel.

18. The compact 3-way fluorescent lamp in accordance with claim 17, further including a pi-section EMI low pass filter for suppression of an electromagnetic interference from switching of the MOSFETs.

19. The compact 3-way fluorescent lamp in accordance with claim 18, wherein the first low wattage ballast unit and the second medium wattage ballast unit include a fusible link including a fuse to disconnect the ballast circuitry in the event of a catastrophic failure, such as a short circuit, for fire hazard protection.

20. The compact 3-way fluorescent lamp in accordance with claim 19, wherein the single U-shaped biaxial tube and the pair of U-shaped biaxial tubes all include two longitudinal leg portions that are substantially parallel to each other and culminate in tube ends.

21. The compact 3-way fluorescent lamp in accordance with claim 20, wherein the first light source includes a lamp filament-carrying electrode at each end of the single U-shaped biaxial tube and the tube ends are sealed.

22. The compact 3-way fluorescent lamp in accordance with claim 21, wherein a lamp filament-carrying electrode is installed at each sealed end of the pair of U-shaped biaxial tubes.

23. The compact 3-way fluorescent lamp in accordance with claim 22, wherein the second fluorescent light source includes two serially connected low wattage lamps operating in parallel from an electrical source.

24. The compact 3-way fluorescent lamp in accordance with claim 23, wherein the double U-shaped biaxial tube has an illumination of essentially two serially connected eleven watt fluorescent lamps.

25. The compact 3-way fluorescent lamp in accordance with claim 24, further including a base configuration and an electrical connection substantially identical to a standard incandescent bulb with the same wattage rating, whereby the compact 3-way fluorescent lamp is capable of being retrofitted in a standard incandescent lamp socket.

26. The compact 3-way fluorescent lamp in accordance with claim 25, wherein the compact 3-way fluorescent lamp produces an illumination substantially equivalent to a standard incandescent bulb with the same wattage rating.

* * * * *